United States Patent
Higashimachi et al.

(10) Patent No.: US 11,858,425 B2
(45) Date of Patent: Jan. 2, 2024

(54) VEHICLE SENSOR ATTACHING STRUCTURE

(71) Applicant: TOYOTA JIDOSHA KABUSHIKI KAISHA, Toyota (JP)

(72) Inventors: Naoya Higashimachi, Toyota (JP); Taro Hasegawa, Toyota (JP); Tsuyoshi Izuhara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 92 days.

(21) Appl. No.: 17/510,890

(22) Filed: Oct. 26, 2021

(65) Prior Publication Data
US 2022/0203904 A1 Jun. 30, 2022

(30) Foreign Application Priority Data

Dec. 25, 2020 (JP) .................................. 2020-216868

(51) Int. Cl.
*B60R 11/00* (2006.01)

(52) U.S. Cl.
CPC ......... *B60R 11/00* (2013.01); *B60R 2011/004* (2013.01)

(58) Field of Classification Search
CPC ... B60R 11/00; B60R 11/04; B60R 2011/004; B60R 2011/0049; G01S 7/497; G01S 7/40; G01S 7/4813; G01S 7/027; G01S 17/88; G01D 11/245

USPC ......................................................... 296/210
See application file for complete search history.

(56) References Cited

U.S. PATENT DOCUMENTS

| 10,099,630 | B1 * | 10/2018 | Krishnan | ............... E05F 15/443 |
| 10,302,744 | B1 * | 5/2019 | Krishnan | ................ B60R 11/04 |
| 10,514,303 | B2 * | 12/2019 | Krishnan | .............. G01S 13/931 |
| 11,240,941 | B2 * | 2/2022 | Frederick | ............. G05D 1/0088 |
| 2016/0334790 | A1 | 11/2016 | Rust et al. | |
| 2018/0015886 | A1 | 1/2018 | Frank et al. | |
| 2019/0161125 | A1 | 5/2019 | Schmidt | |
| 2022/0075030 | A1 * | 3/2022 | D'Antonio | ............ G01S 17/931 |
| 2022/0266763 | A1 * | 8/2022 | Huelsen | ................. B62D 25/06 |

FOREIGN PATENT DOCUMENTS

| DE | 102019122197 A1 * | 2/2021 | ............. B60R 11/04 |
| JP | 2019-060680 A | 4/2019 | |
| JP | 2021-154765 A | 10/2021 | |

* cited by examiner

*Primary Examiner* — Anita M King
(74) *Attorney, Agent, or Firm* — Dinsmore & Shohl LLP

(57) ABSTRACT

A vehicle sensor attaching structure in which a plurality of kinds of external sensors for detecting an external condition of a vehicle is attached on a roof of the vehicle, the vehicle sensor attaching structure including: a common sensor unit that is fixed to the roof of the vehicle and to which at least one kind of the external sensor is attached; and an option sensor unit that is attachable to the common sensor unit in at least two directions of a vehicle left side, a vehicle right side, a vehicle upper side, a vehicle front side, and a vehicle rear side, that is detachably attached to the common sensor unit, and to which at least one kind of the external sensor is attached.

8 Claims, 8 Drawing Sheets

VEHICLE SENSOR ATTACHING STRUCTURE

CROSS-REFERENCE TO RELATED APPLICATION

This application claims priority to Japanese Patent Application No. 2020-216868 filed on Dec. 25, 2020, incorporated herein by reference in its entirety.

BACKGROUND

1. Technical Field

The disclosure relates to a vehicle sensor attaching structure.

2. Description of Related Art

US Patent Application Publication No. 2016-0334790 is known as a technical document relating to a vehicle sensor attaching structure. This document shows a vehicle in which various sensors for detecting the external condition of the vehicle are attached as an integrated unit in the center of a roof.

SUMMARY

However, if all the sensors on the roof are made into a non-removable integrated unit, there is a problem that maintenance becomes difficult in the event of a sensor failure or the like.

An aspect of the present disclosure is a vehicle sensor attaching structure in which a plurality of kinds of external sensors for detecting an external condition of a vehicle is attached on a roof of the vehicle, the vehicle sensor attaching structure including: a common sensor unit that is fixed to the roof of the vehicle and to which at least one kind of the external sensor is attached; and an option sensor unit that is attachable to the common sensor unit in at least two directions of a vehicle left side, a vehicle right side, a vehicle upper side, a vehicle front side, and a vehicle rear side, that is detachably attached to the common sensor unit, and to which at least one kind of the external sensor is attached.

According to the vehicle sensor attaching structure according to one aspect of the disclosure, According to the vehicle sensor attaching structure according to tone aspect of the disclosure, by having a structure in which the optional sensor units are detachably attached to the common sensor unit, maintenance can be facilitated as compared with the case where all the sensors are a non-removable integrated unit, by exchanging external sensors of the optional sensor units when the external sensors of the optional sensor units need to be changed.

In the vehicle sensor attaching structure described above, the option sensor unit may include a first option sensor unit attached on the vehicle left side of the common sensor unit and a second option sensor unit attached on the vehicle right side of the common sensor unit.

Further, according to this vehicle sensor attaching structure, by having a structure in which the first option sensor unit and the second option sensor unit are attached to the right and left of the common sensor unit, it is possible to easily perform maintenance by exchanging the external sensors per unit when either external sensor of the first option sensor unit and the second option sensor unit need to be replaced.

In the vehicle sensor attaching structure described above, the common sensor unit may have a common frame body and the option sensor unit has an option frame body connected to the common frame body.

Further, according to this vehicle sensor attaching structure, by adopting the common frame body and the option frame body, it is possible to secure sufficient rigidity while being relatively lightweight.

In the vehicle sensor attaching structure described above, the option sensor unit may include a third option sensor unit that is attached on the vehicle upper side of the common sensor unit and that is offset and disposed so as to project to either the right or left of the common sensor unit.

According to the vehicle sensor attaching structure, even when the option sensor units cannot be added to the right and left of the common sensor unit due to insufficient vehicle width or the like, by offsetting and arranging the option sensor units so as to project to the right and left from the vehicle upper side of the common sensor unit, it is possible to easily add sensors to the right and left of the vehicle.

According to one aspect of the present disclosure, maintenance of an external sensor attached to a roof of a vehicle can be facilitated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described with reference to the drawings. In each figure, an XYZ rectangular coordinate system is shown in which a vehicle front-rear direction is an X-axis, a vehicle width direction is a Y-axis, and a vehicle height direction is a Z-axis.

Figure 1:
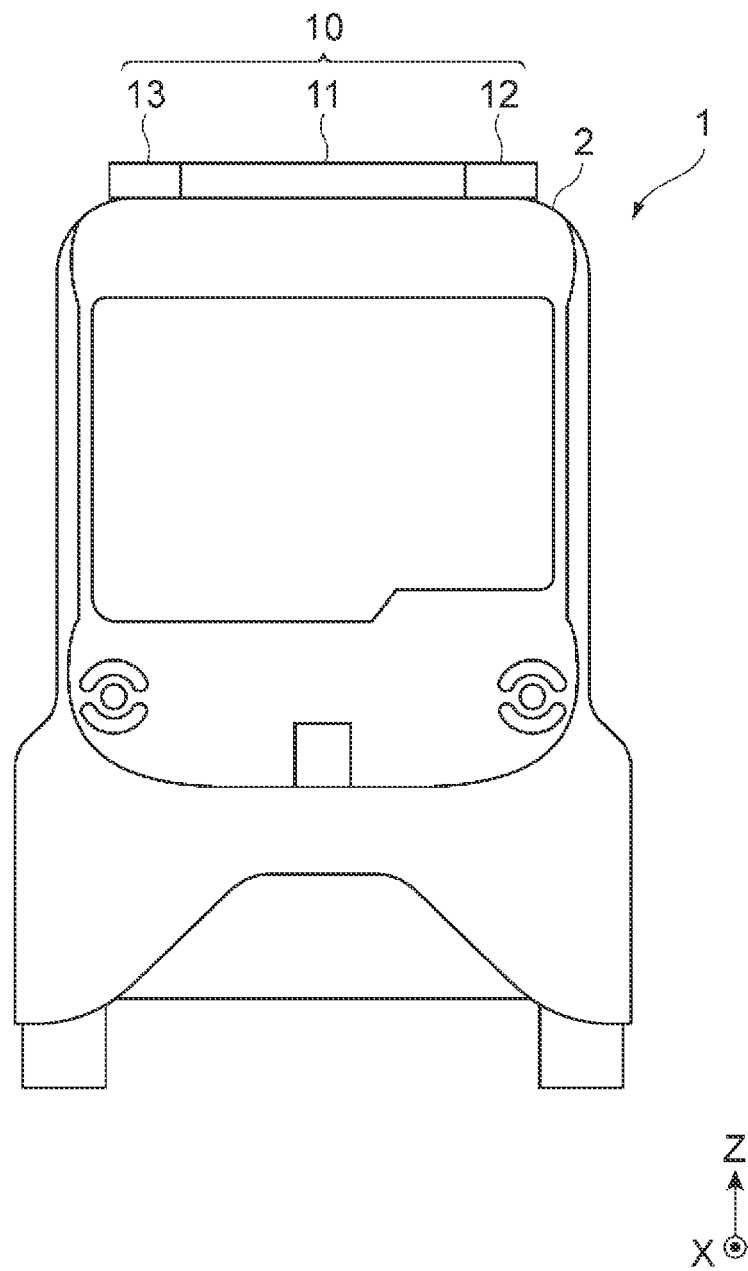
FIG. 1 is a diagram showing a vehicle that includes a vehicle sensor attaching structure according to an embodiment.
Figure 2:
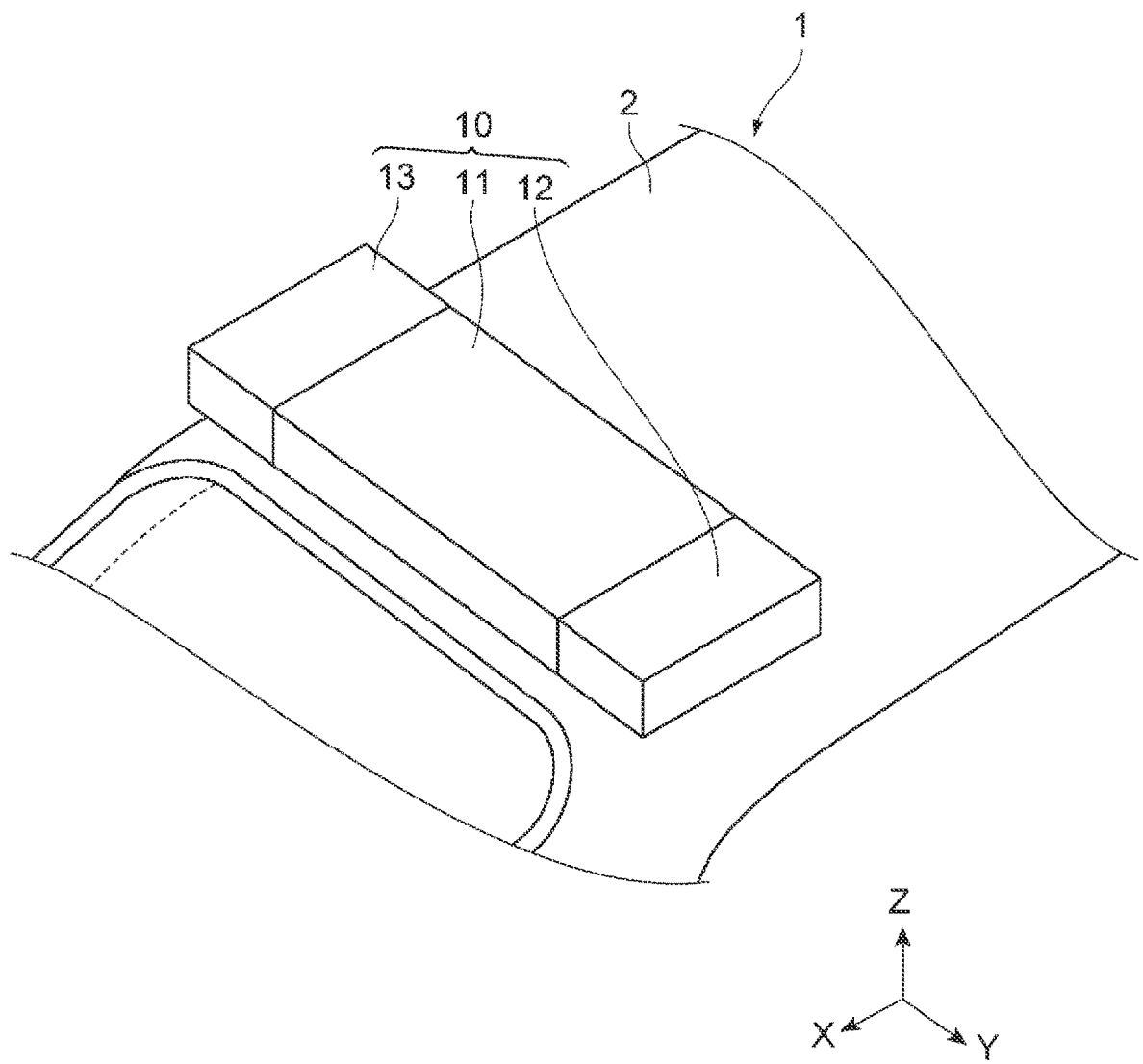
FIG. 2 is an enlarged view showing an example of a vehicle sensor attaching structure.

FIG. 1 is a diagram showing a vehicle that includes a vehicle sensor attaching structure according to an embodiment. FIG. 2 is an enlarged view showing an example of a vehicle sensor attaching structure. A vehicle 1 shown in FIGS. 1 and 2 is, for example, a vehicle in the shape of a small bus. The vehicle type and shape of the vehicle 1 are not particularly limited as long as the vehicle sensor attaching structure of the present embodiment can be adopted.

A roof front sensor group 10 is mounted on a front side of a roof 2 of the vehicle 1. The vehicle type and shape of the vehicle 1 are not particularly limited as long as the roof front sensor group 10 can be mounted. A roof rear sensor unit having the same configuration as the roof front sensor group 10 may be provided on a rear side of the roof 2 of the vehicle 1.

The roof front sensor group 10 is equipped with a plurality of external sensors for detecting the external condition of the vehicle 1 (such as the condition of an object such as another vehicle). Each external sensor is a detection device that detects the external condition of the vehicle. The external sensor includes at least two kinds of sensors such as a camera and a LiDAR. The camera is an imaging device that captures images of an external condition of the vehicle. The camera may be a monocular camera or a stereo camera. The LiDAR is a detection device for detecting an object around the vehicle by using light. The LiDAR transmits light to the surroundings of the vehicle and detects the object by receiving the light reflected by the object around the vehicle. The external sensor may include a millimeter wave radar. The configuration of the external sensor will be described later.

As shown in FIGS. 1 and 2, the roof front sensor group 10 includes the common sensor unit 11, the first option sensor unit 12, and a second option sensor unit 13 as an example.

The common sensor unit 11 is a unit fixed to the roof 2 of the vehicle 1 and to which at least one kind of external sensor is attached. The method of fixing the common sensor unit 11 to the roof 2 is not particularly limited. The common sensor unit 11 may be fixed by bolting, may be fixed by adhesion, or may be mechanically fixed by fitting into a fitting portion formed on the roof 2 side. The first option sensor unit 12 is provided on the vehicle left side with respect to the common sensor unit 11, and the second option sensor unit 13 is provided on the vehicle right side with respect to the common sensor unit 11.

Figure 3:
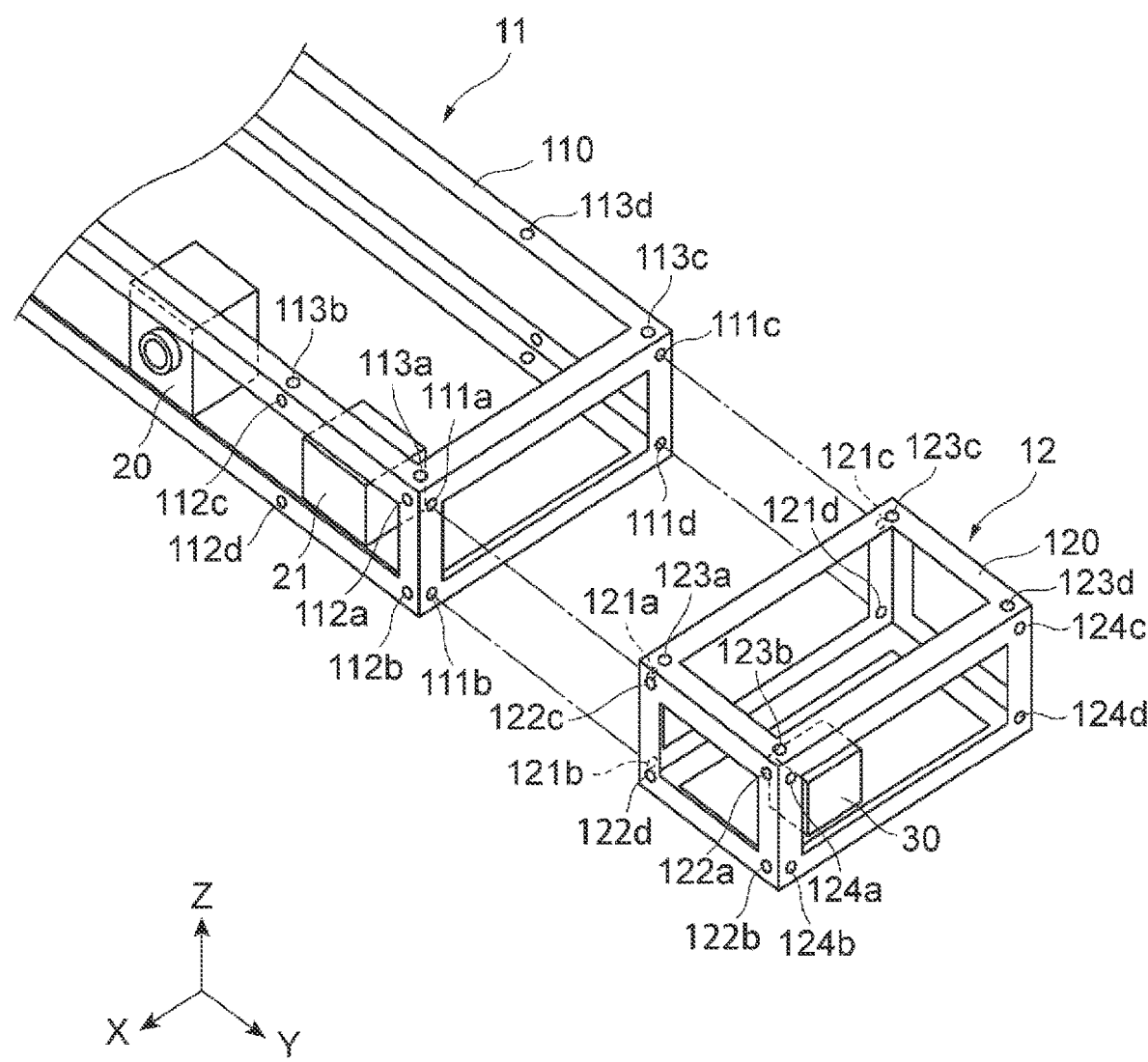
FIG. 3 is a diagram showing an example of attaching a first option sensor unit to a common sensor unit.

FIG. 3 is a diagram showing an example of attaching the first option sensor unit 12 to the common sensor unit 11. As shown in FIG. 3, the common sensor unit 11 has a common frame body 110. The common frame body 110 is a frame body that is the base of the common sensor unit 11. The common sensor unit 11 has a cover member (not shown) that covers at least a part of the common frame body 110. In some embodiments, the cover member is provided.

As an example, the common frame body 110 can have a rectangular parallelepiped frame structure composed of angle members. The angle member is a long member having an L-shaped cross section. The material of the common frame body 110 is not particularly limited as long as it has an appropriate hardness. For the common frame body 110, for example, an aluminum material, a casting member, or a resin (fiber reinforced resin or the like) can be used. The shape of the common frame body 110 is not limited to a rectangular parallelepiped, and may have a curved portion, or an end portion of a part of the angle member in the extending direction may be protruded.

A camera 20 and a LiDAR 21 that are external sensors are attached to the common frame body 110. The camera 20 and LiDAR 21 are attached so as to face the vehicle front side, and detect the external condition in front of the vehicle 1. More external sensors may be attached to the common frame body 110. The LiDAR 21 of the common frame body 110 can be a large size LiDAR that is relatively large.

The front surface (the surface on the vehicle front side) of the camera 20 and the LiDAR 21 in the common frame body 110 may be a glass window, or the camera 20 and the LiDAR 21 may be exposed. This point is the same in the first option sensor unit 12, the second option sensor unit 13, and the like.

The common frame body 110 is formed with bolt holes for attaching the first option sensor unit 12, the second option sensor unit 13, and the like. In FIG. 3, the first option sensor unit 12 is attached using left side surface bolt holes 111a to 111d provided on the vehicle left side of the common frame body 110. Front surface bolt holes 112a to 112d, upper surface bolt holes 113a to 113d, and the like are formed on the common frame body 110. Bolt holes may be formed on all the upper, lower, right, and left surfaces of the common frame body 110, or bolt holes may be formed on only two surfaces.

The first option sensor unit 12 has a first option frame body 120. As an example, the first option frame body 120 can have a rectangular parallelepiped frame structure composed of the same angle members as the common frame body 110. The first option frame body 120 has a width shorter than that of the common frame body 110 in a vehicle width direction, and has the same depth as the common frame body 110 in the vehicle front-rear direction (X-axis direction), for example.

On the right side surface of the first option frame body 120, right side surface bolt holes 121a to 121d facing the left side surface bolt holes 111a to 111d of the common frame body 110 are formed. The first option frame body 120 is connected to the common frame body 110 by being coupled by four bolts so that the bolts pass through the right side surface bolt holes 121a to 121d and the left side surface bolt holes 111a to 111d of the common frame body 110.

Further, front side bolt holes 122a to 122d, upper surface bolt holes 123a to 123d, and left side bolt holes 124a to 124d for attaching the first option frame body 120 to the common frame body 110 from a different direction are formed on the first option frame body 120. The first option frame body 120 may have bolt holes formed on at least one surface.

The method of attaching (connecting) the first option frame body 120 to the common frame body 110 is not limited to bolt fixing. The attaching method may be a removable method. The common frame body 110 and the first option frame body 120 may be fastened by fastening the angle members to each other with metal fittings such as a stainless band, or may be attached via brackets. This point is the same in the attaching method of the common frame body 110 and another option frame body. The first option sensor unit 12 may be configured to be attachable to the common sensor unit 11 in at least two directions of the vehicle left side, the vehicle right side, the vehicle upper side, the vehicle front side, and the vehicle rear side, for example.

A left side LiDAR 30 that is an external sensor provided so as to face the vehicle left side is attached to the first option frame body 120. The left side LiDAR 30 attached to the first option frame body 120 may be a small size LiDAR that is relatively small. The first option frame body 120 may be provided with a plurality of external sensors in addition to the left side LiDAR 30.

Figure 4:
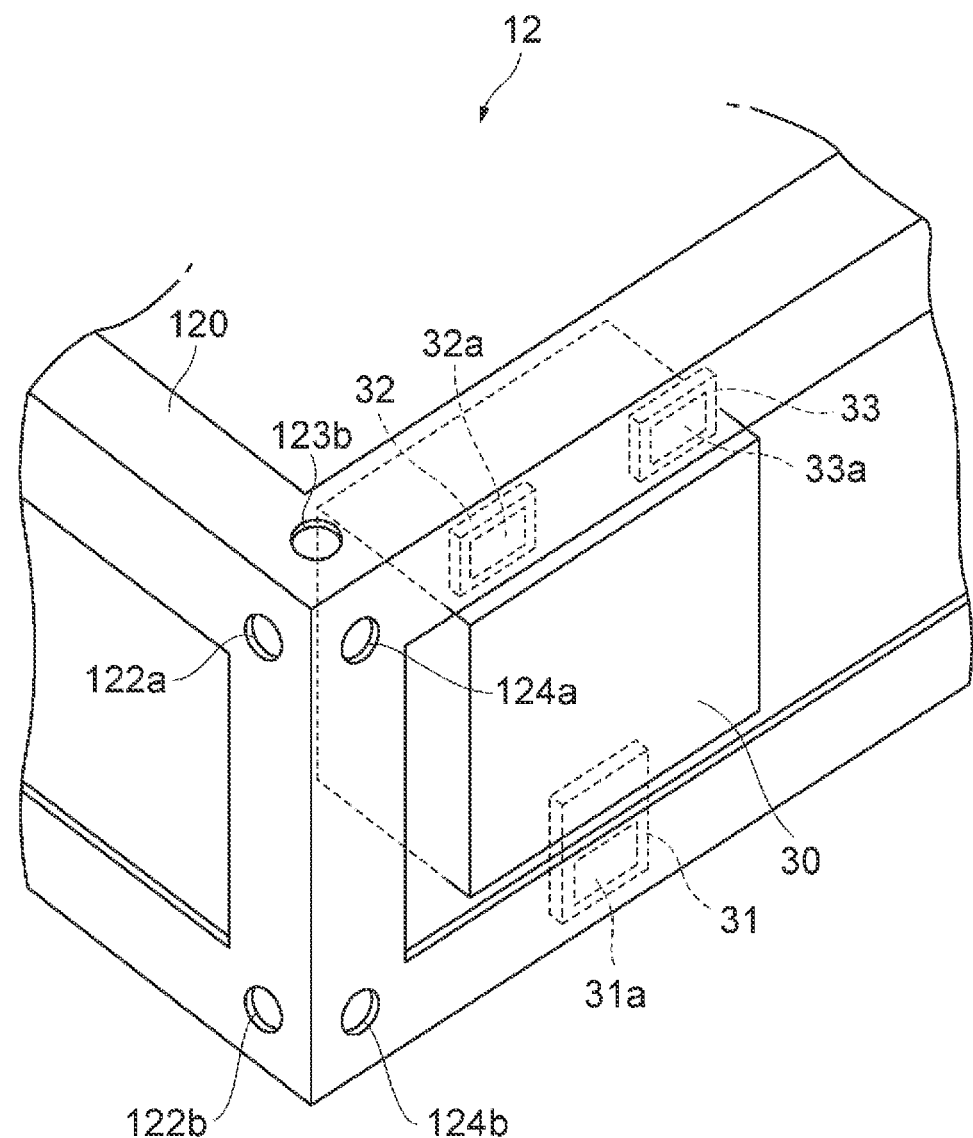
FIG. 4 is a diagram showing an example of attaching a sensor on of a first option frame body.
Figure 4:
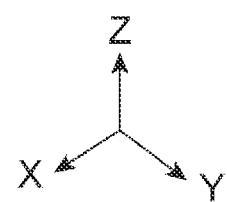

FIG. 4 is a diagram showing an example of attaching a sensor on of the first option frame body 120. As shown in FIG. 4, the left side LiDAR 30 is attached to the first option frame body 120 so as to face the vehicle left side from the inside of the frame. The left side LiDAR 30 is provided with a lower side attaching portion 31, a first upper side attaching portion 32, and a second upper side attaching portion 33.

The lower side attaching portion 31, the first upper side attaching portion 32, and the second upper side attaching portion 33 are each portions to be joined to the inside of the first option frame body 120 (inside the angle member). The lower side attaching portion 31 projects downward of the left side LiDAR 30 and is joined to the inside of the first option frame body 120 via a cushion material 31a.

The cushion material 31a is not particularly limited as long as it is an elastic bonding material. The cushion material 31a may be made of rubber, for example, and may be made of an ethylene propylene diene rubber foam having adhesiveness.

The first upper side attaching portion 32 and the second upper side attaching portion 33 project upward from the left side LiDAR 30, and are each joined to the inside of the first option frame body 120 via cushion materials 32a and 33a. The materials of the cushion materials 32a and 33a can be the same as those of the cushion material 31a.

The lower side attaching portion 31, the first upper side attaching portion 32, and the second upper side attaching portion 33 may be directly joined to the first option frame body 120 without using a cushion material. The left side LiDAR 30 may have two attaching portions on the top and bottom, or may have four or more attaching portions. The camera 20 and LiDAR 21 in the common frame body 110 may be attached in the same manner.

Figure 5:
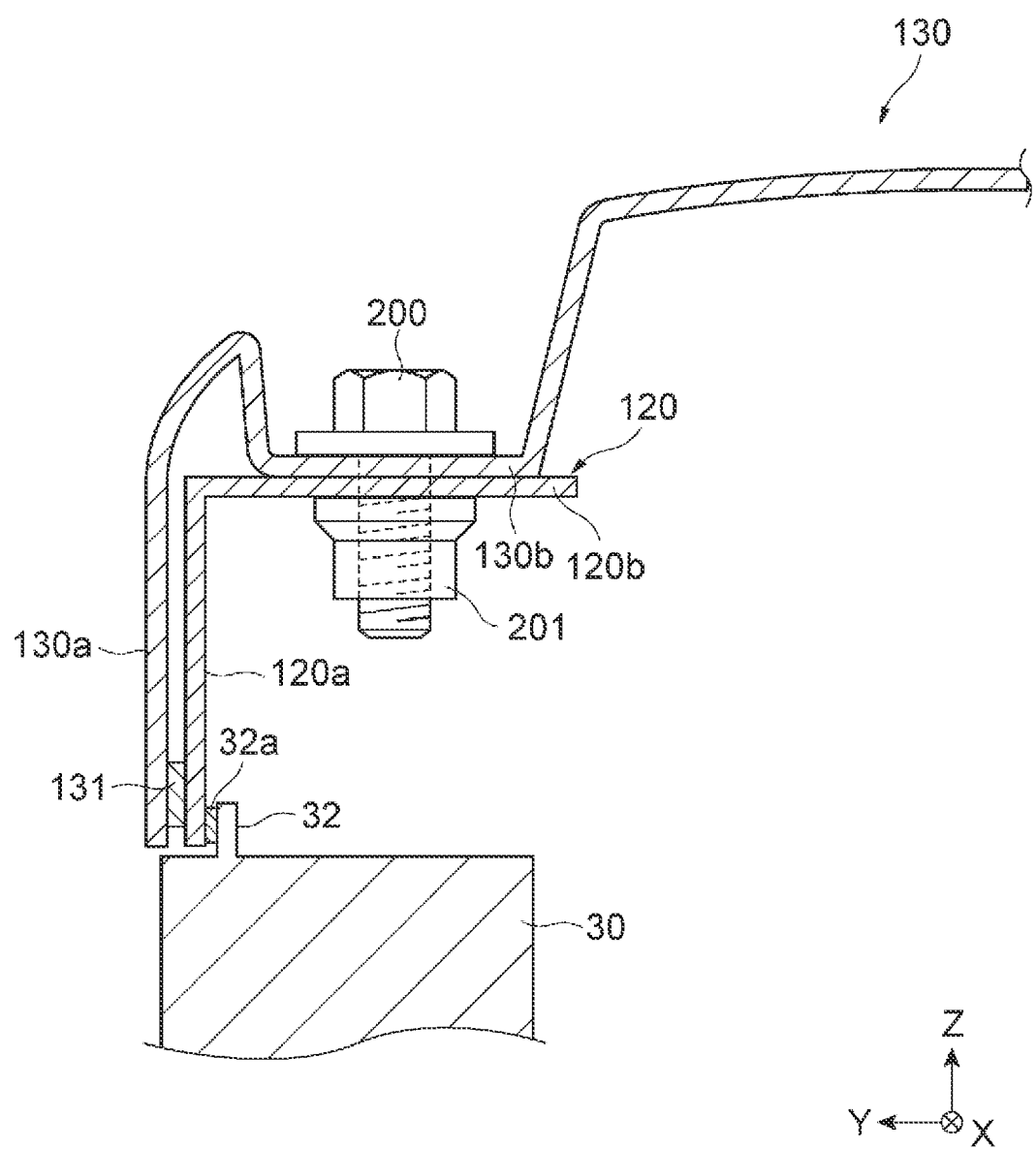
FIG. 5 is a diagram showing an example of attaching a cover member to the first option frame body.

FIG. 5 is a diagram showing an example of attaching a cover member to the first option frame body 120. In FIG. 5, a bolt 200 and a nut 201 located at the back are also shown in order to explain the attachment of the cover member to the first option frame body 120.

As shown in FIG. 5, a cover member 130 is attached to the first option frame body 120. The cover member 130 is a member provided so as to cover the first option frame body 120 from above. The material of the cover member 130 is not particularly limited, but can be formed from, for example, resin.

The cover member 130 includes a side surface portion 130a that covers an angle member side surface portion 120a on the vehicle left side of the first option frame body 120, and an upper surface fixing portion 130b that is bolted to an angle member upper surface portion 120b of the first option frame body 120.

The side surface portion 130a of the cover member 130 is joined to the angle member side surface portion 120a via a cover cushion material 131. The material of the cover cushion material 131 can be the same as that of the cushion material 31a, for example.

The upper surface fixing portion 130b of the cover member 130 is fixed to the angle member upper surface portion 120b of the first option frame body 120 by the bolt 200 and the nut 201. An additional metal color or the like may be used.

The shape of the cover member 130 is not particularly limited. The cover member 130 may have a shape that covers the entire first option frame body 120 from above, or may have a shape that covers both the first option frame body 120 and the common frame body 110. The cover member 130 may have a shape that covers a second option frame body (not shown) of the second option sensor unit 13 in addition to the first option frame body 120 and the common frame body 110. Alternatively, the cover member 130 may have a shape capable of covering at least the top of an external sensor such as the left side LiDAR 30 attached to the first option frame body 120. The second option sensor unit 13 can have the same configuration as the first option sensor unit 12.

According to the vehicle sensor attaching structure according to the present embodiment described above, by having a structure in which the option sensor units 12 and 13 are detachably attached to the common sensor unit 11, maintenance can be facilitated as compared with the case where all the sensors are a non-removable integrated unit, by exchanging external sensors of the option sensor units 12 and 13 when the external sensors of the option sensor units 12 and 13 need to be changed.

Further, according to this vehicle sensor attaching structure, by having a structure in which the first option sensor unit 12 and the second option sensor unit 13 are attached to the right and left of the common sensor unit 11, it is possible to easily perform maintenance by exchanging the external sensors per unit when either external sensor of the first option sensor unit 12 and the second option sensor unit 13 need to be replaced.

Further, according to this vehicle sensor attaching structure, by adopting the common frame body 110 and the first option frame body 120, it is possible to secure sufficient rigidity while being relatively lightweight.

In this vehicle sensor attaching structure, when various kinds of autonomous driving kits are installed, by having a configuration in which the common sensor unit 11 and the option sensor units 12 and 13 can be selectively adopted, the degree of freedom in design can be increased and the sensor installation can be versatile for various kinds of vehicles.

Although the embodiment of the disclosure has been described above, the disclosure is not limited to the embodiment above. The disclosure can be implemented in various modes including various modifications and improvements based on the knowledge of those skilled in the art, including the embodiment as described above.

Figure 6:
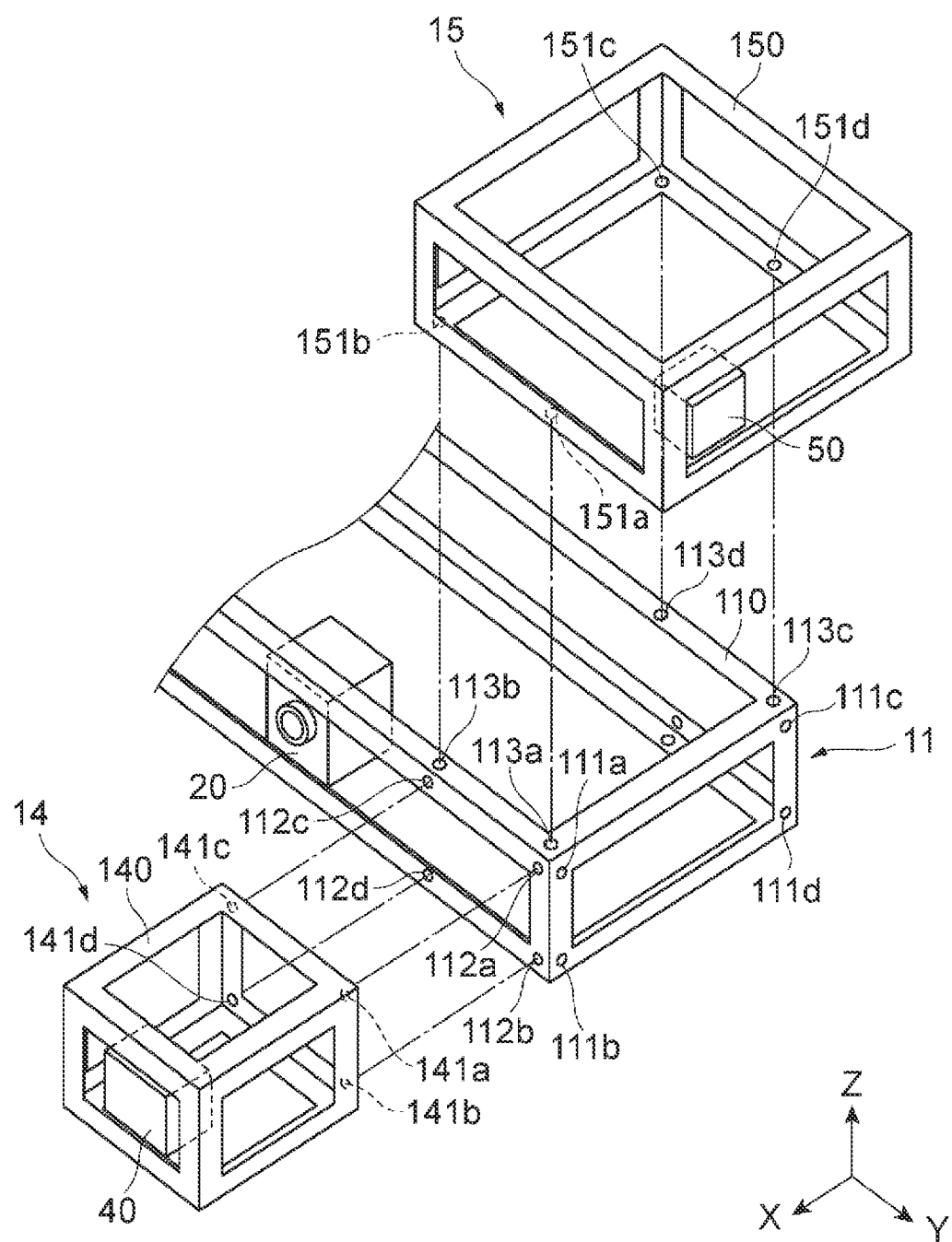
FIG. 6 is a diagram showing an example of attaching another optional frame body to a common frame body.

FIG. 6 is a diagram showing an example of attaching another optional frame body to the common frame body 110. In FIG. 6, a third option sensor unit 14 and a fourth option sensor unit 15 are attached to the common sensor unit 11.

A third option frame body 140 of the third option sensor unit 14 is attached to the vehicle front side of the common frame body 110. The third option frame body 140 also has a rectangular parallelepiped shape made of an angle member. As an example, the third option frame body 140 is formed so as to have a width that does not protrude from the common frame body 110 when viewed from the front of the vehicle.

Rear surface bolt holes 141a to 141d facing the front surface bolt holes 112a to 112d of the common frame body 110 are formed on the rear surface of the third option frame body 140. The third option frame body 140 is coupled to the common frame body 110 by being connected by four bolts so that the bolts pass through the rear surface bolt holes 141a to 141d and the front surface bolt holes 112a to 112d of the common frame body 110. The third option frame body 140 may also have bolt holes formed on other surfaces.

As an example, a left front side LiDAR 40 is attached to the third option sensor unit 14 so as to face the front of the vehicle. A camera or another external sensor may be adopted instead of the LiDAR, or an external sensor may be attached to another surface.

A fourth option frame body 150 of the fourth option sensor unit 15 is attached to the vehicle upper side of the common frame body 110. The fourth option frame body 150 also has a rectangular parallelepiped shape made of an angle member.

The fourth option frame body 150 is offset on the vehicle left side (in the vehicle width direction) so as to project from the common frame body 110. The offset arrangement means that the option sensor unit is arranged so as to project to either the right or left side of the common sensor unit 11. As a result, even if the width of the roof 2 of the vehicle 1 is insufficient, the external sensor can be provided so as to project to the outside of the vehicle 1.

Lower surface bolt holes 151a to 151d facing the upper surface bolt holes 113a to 113d of the common frame body 110 are formed on a lower surface of the fourth option frame body 150. The fourth option frame body 150 is also fixed to the common frame body 110 by four bolts.

As an example, the left side LiDAR 50 is attached to the fourth option frame body 150 so as to face the vehicle left side. A camera or another external sensor may be adopted instead of the LiDAR, or an external sensor may be attached to another surface.

In addition, an option sensor unit on the vehicle left side or the vehicle rear side may be attached to the common sensor unit 11. The option sensor unit on the vehicle rear side may be offset to the right and left of the common sensor unit 11. The third option sensor unit 14 and the fourth option sensor unit 15 may also be covered with the cover member.

According to the vehicle sensor attaching structure of the other example described above, even when the option sensor units 12 and 13 cannot be added to the right and left of the common sensor unit 11 due to insufficient vehicle width or the like, by offsetting and arranging the option sensor units so as to project to the right and left from the vehicle upper side of the common sensor unit 11, it is possible to easily add sensors to the right and left of the vehicle.

Figure 7:
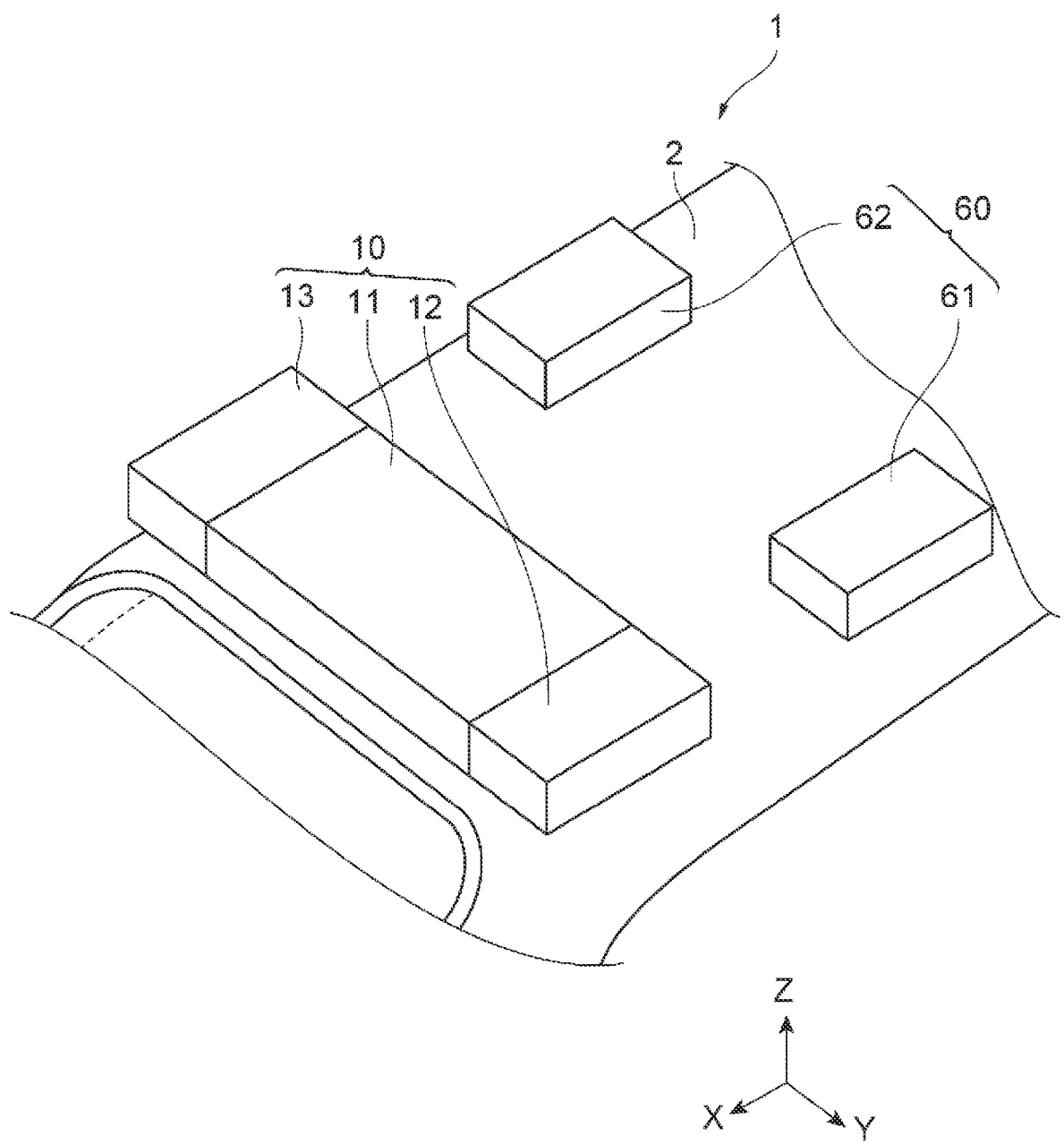
FIG. 7 is a diagram showing another example of attaching an option sensor unit to the vehicle.

FIG. 7 is a diagram showing another example of attaching an option sensor unit to the vehicle. As shown in FIG. 7, an option sensor unit 60 may be additionally provided independently on the roof 2 of the vehicle 1 in addition to the roof front sensor group 10.

The option sensor unit 60 includes, for example, a left side option sensor unit 61 and a right side option sensor unit 62. The left side option sensor unit 61 and the right side option sensor unit 62 are directly attached to the roof 2 of the vehicle 1 instead of the common sensor unit. This makes it possible to add an external sensor to the roof 2 of the vehicle 1 for general purposes.

Figure 8:
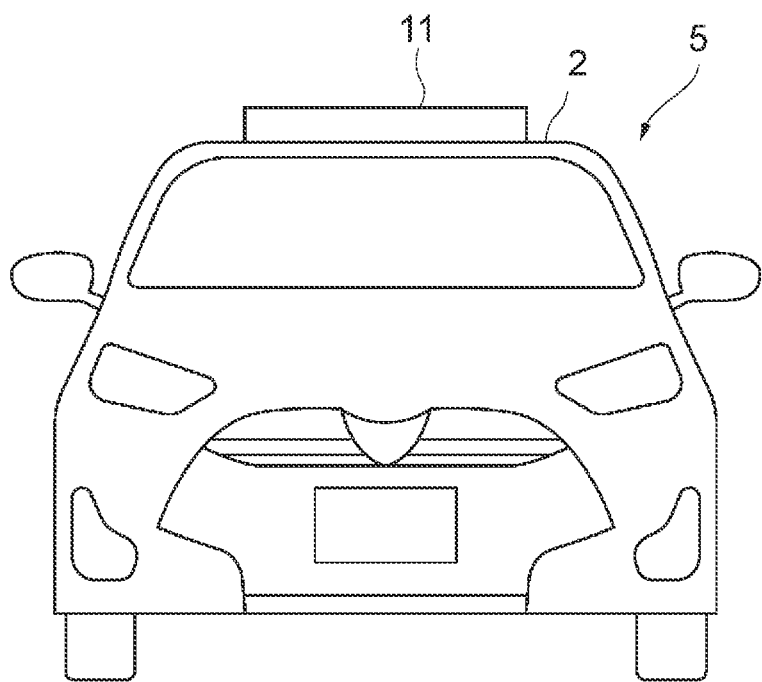
FIG. 8 is a diagram showing a reference example of a vehicle having a common sensor unit.

FIG. 8 is a diagram showing a reference example of the vehicle having the common sensor unit 11. In the roof 2 of the passenger car 5 shown in FIG. 8, only the common sensor unit 11 is adopted. That is, depending on the vehicle model, it is possible to provide an option not to adopt the option sensor unit, and it is possible to increase the degree of freedom in design.

The common frame body 110 and various option frame bodies do not necessarily have to have a structure using an angle member. The structure may be a plate-shaped member or a rod-shaped member. The first option sensor unit 12 and the second option sensor unit 13 may be fixed to the roof 2 of the vehicle 1 in addition to the common sensor unit 11. The fourth option frame body 150 may be offset so as to project toward the front of the vehicle.

What is claimed is:

1. A vehicle sensor attaching structure in which a plurality of kinds of external sensors for detecting an external condition of a vehicle is attached on a roof of the vehicle, the vehicle sensor attaching structure comprising:
   a common sensor unit that is fixed to the roof of the vehicle and to which at least one kind of the external sensor is attached; and
   an option sensor unit that is attachable to the common sensor unit in at least two directions of a vehicle left side, a vehicle right side, a vehicle upper side, a vehicle front side, and a vehicle rear side, that is detachably attached to the common sensor unit, and to which at least one kind of the external sensor is attached.

2. The vehicle sensor attaching structure according to claim 1, wherein the option sensor unit includes a first option sensor unit attached on the vehicle left side of the common sensor unit and a second option sensor unit attached on the vehicle right side of the common sensor unit.

3. The vehicle sensor attaching structure according to claim 1, wherein the common sensor unit has a common frame body and the option sensor unit has an option frame body connected to the common frame body.

4. The vehicle sensor attaching structure according to claim 1, wherein the option sensor unit includes a third option sensor unit that is attached on the vehicle upper side of the common sensor unit and that is offset and disposed so as to project to either the right or left of the common sensor unit.

5. A vehicle sensor attaching structure in which a plurality of kinds of external sensors for detecting an external condition of a vehicle is attached on a roof of the vehicle, the vehicle sensor attaching structure comprising:
   a common sensor unit that is fixed to the roof of the vehicle and to which at least one kind of the external sensor is attached, the common sensor unit having a vehicle left side, a vehicle right side, a vehicle upper side, a vehicle front side, and a vehicle rear side, the common sensor unit having at least one bolt hole provided on at least two sides of the vehicle left side, the vehicle right side, the vehicle upper side, the vehicle front side, and the vehicle rear side; and
   an option sensor unit that is attachable to the common sensor unit by engaging with the at least one bolt hole on at least two sides of the vehicle left side, the vehicle right side, the vehicle upper side, the vehicle front side, and the vehicle rear side, that is detachably attached to the common sensor unit, and to which at least one kind of the external sensor is attached.

6. The vehicle sensor attaching structure according to claim 5, wherein the option sensor unit includes a first option sensor unit attached on the vehicle left side of the common sensor unit and a second option sensor unit attached on the vehicle right side of the common sensor unit.

7. The vehicle sensor attaching structure according to claim 5, wherein the common sensor unit has a common frame body and the option sensor unit has an option frame body connected to the common frame body.

8. The vehicle sensor attaching structure according to claim 5, wherein the option sensor unit includes a third option sensor unit that is attached on the vehicle upper side of the common sensor unit and that is offset and disposed so as to project to either the right or left of the common sensor unit.

* * * * *